United States Patent
Lee et al.

(12) United States Patent — Lee et al.

(10) Patent No.: US 7,027,664 B2
(45) Date of Patent: Apr. 11, 2006

(54) METHOD FOR REMOVING NOISE REGIONS IN STEREO 3D DISPLAY SYSTEM

(75) Inventors: Ruen-Rone Lee, Hsinchu (TW); Li-Shu Lu, Taoyuan (TW); Yu-Ming Huang, Tainan (TW)

(73) Assignee: Silicon Integrated Systems Corporation, Hsinchu (TW)

( * ) Notice: Subject to any disclaimer, the term of this patent is extended or adjusted under 35 U.S.C. 154(b) by 523 days.

(21) Appl. No.: 10/093,747

(22) Filed: Mar. 11, 2002

(65) Prior Publication Data

US 2003/0071892 A1    Apr. 17, 2003

(30) Foreign Application Priority Data

Sep. 13, 2001   (TW) .............. 90122714 A (51) Int. Cl.
*G06K 9/20*      (2006.01)
*H04N 13/04*     (2006.01)

(52) U.S. Cl. .............. 382/283; 382/154; 348/51

(58) Field of Classification Search ............... 382/154, 382/164, 167, 212, 252, 266, 283, 284, 285, 382/294, 264, 269, 274, 275; 348/14.14, 348/14.15, 47, 51; 345/419
See application file for complete search history.

(56) References Cited

U.S. PATENT DOCUMENTS

| | | | | |
|---|---|---|---|---|
| 4,979,033 A | * | 12/1990 | Stephens | 348/56 |
| 5,606,363 A | * | 2/1997 | Songer | 348/49 |
| 5,627,582 A | * | 5/1997 | Muramoto et al. | 348/43 |
| 5,917,539 A | * | 6/1999 | Sorensen et al. | 348/56 |
| 6,118,584 A | * | 9/2000 | Van Berkel et al. | 359/463 |
| 6,191,808 B1 | * | 2/2001 | Katayama et al. | 348/39 |
| 6,476,850 B1 | * | 11/2002 | Erbey | 348/51 |

* cited by examiner

*Primary Examiner*—Daniel Miriam
(74) *Attorney, Agent, or Firm*—Nixon Peabody LLP; Donald R. Studebaker (57) ABSTRACT

A method for removing noise regions in a stereo 3D image, which includes a first eye image and a second eye image is achieved by calculating a maximum offset value and turning a horizontal synchronization signal and a display enable signal of the CRT timing parameters.

20 Claims, 7 Drawing Sheets

METHOD FOR REMOVING NOISE REGIONS IN STEREO 3D DISPLAY SYSTEM

FIELD OF THE INVENTION

The present invention relates to a method for processing a stereo 3D image and more particularly, to a method for removing noise regions of the stereo 3D image in a stereo 3D display system.

BACKGROUND OF THE INVENTION

From the 2D plane image and the 3D plane image to the 3D stereo image, the computer user's request for image quality is getting higher and higher. Since human beings have two eyes observing object independently, human beings can see the stereo object. The view angles of two eyes are different so that the images two eyes respectively observe are different. After images fusing by the brain, human beings can see the stereo image. Hereinafter, "stereo" of image means the depth and solidity of the image.

Figure 1:
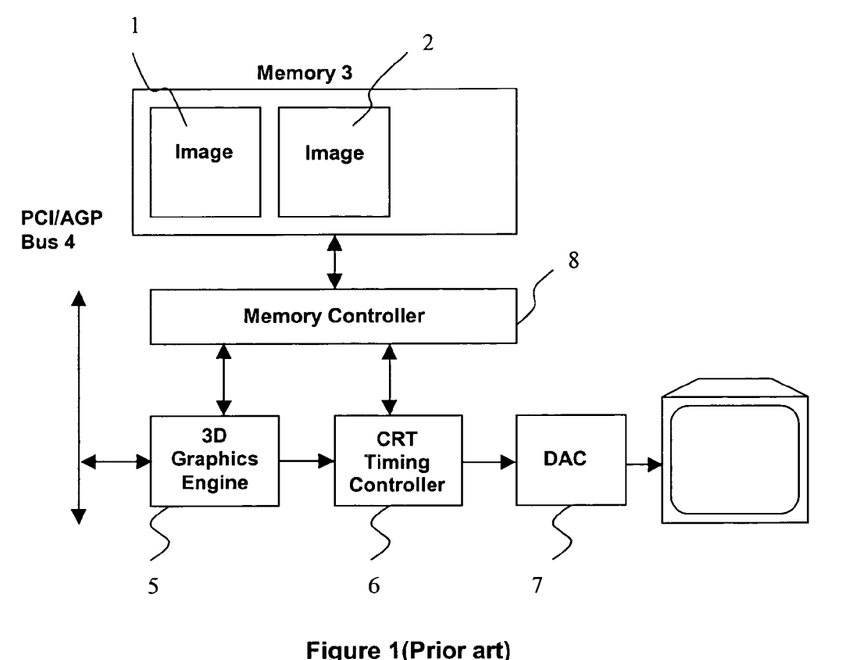
FIG. 1 shows a 3D graphics system of prior art.

As shown in FIG. 1, in a computer plane 3D graphics system, the AGP or PCI bus 4 transmits the 2D or 3D graphics command to the 3D graphics engine 5. The Digital-Analog Converter 7 displays the analog signal converted from the digital signal of the image on the monitor. The 3D graphics system further includes a graphics memory 3 and a memory controller 8.

Figure 2:
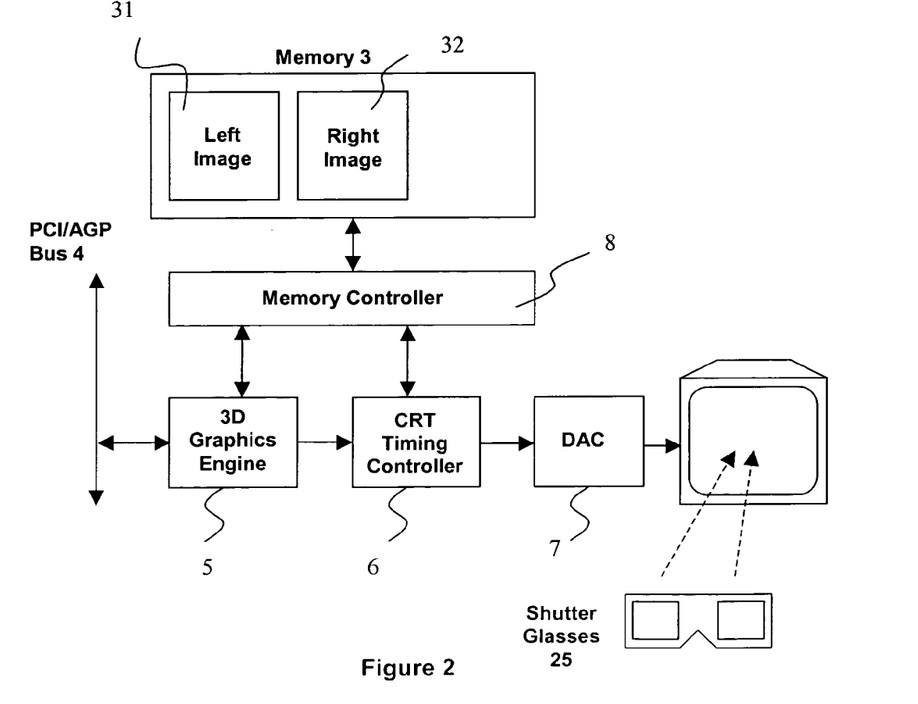
FIG. 2 shows a stereo 3D display system.

FIG. 2 discloses a stereo 3D image system. Similarly, the stereo image system includes a 3D graphics engine 5 for receiving the graphics command from the AGP or PCI bus 4. The 3D graphics engine 5 transmits the image data through the Digital-Analog Converter 7 to the timing controller 6, and displays the image on the monitor. The difference between the stereo 3D image system and the plane 3D image system is that the image of the stereo 3D image system includes a left eye image 31 and a right eye image 32. The stereo 3D image system simulates the different view angles of two eyes observing objects to produce the different left eye image 31 and the right eye image 32. The left eye image 31 and the right eye image 32 are stored in the graphics memory. The stereo 3D image system lets the left eye see the left eye image 31 only and lets the right eye see the right eye image 32 only by using a synchronized signal.

Since human beings have two eyes and there is only one monitor, human beings can't see the effect of stereo image on the monitor. The method to solve this problem is to group the images respectively observed by the right eye and by the left eye and alternately displaying the images for right and left eye on the monitor. And the images are viewed through a synchronized shutter viewer (shutter classes). The working principle of the shutter glasses is to mask the right eye while the monitor is displaying the left eye image, and to mask the left eye while the monitor is displaying the right eye image. Due to the fast alternate display of images on the monitor and the image-residual of vision of human beings, human beings' brain generates stereo vision. The stereo 3D image system determines when to display the left image 31 and the right image 32 using a memory controller 8.

Figure 3:
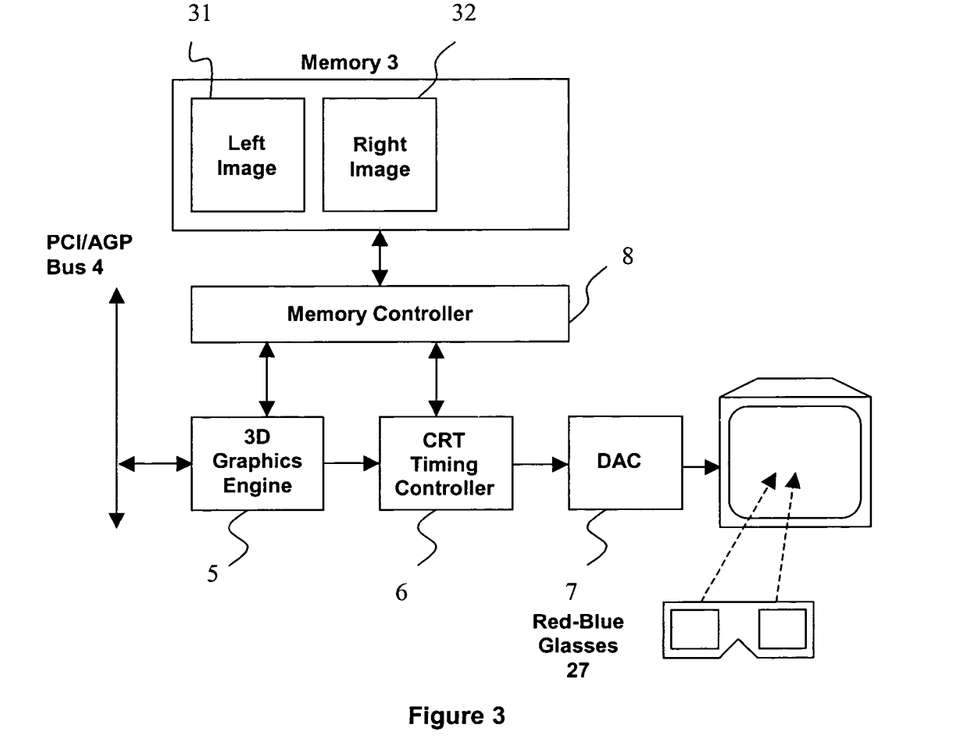
FIG. 3 shows another stereo 3D display system.

In addition, as shown in FIG. 3, a 3D graphics engine 5 in another stereo 3D image system receives the graphics command from the AGP or PCI bus, transmits the image data to the CRT timing controller 6 and the digital-analog converter 7 and displays the image on the monitor. But in this stereo 3D image system, a red-blue glasses 27 replaces the shutter glasses 25. The stereo 3D system reddens one of the right eye image and the left eye image by filtering the blue light and the green light, and blues the other image of the right eye image and left eye image by filtering the red light. Through the red glass of the red-blue glasses allowing red light passing, only the red image can be seen. Through the blue glass of the red-blue glasses allowing blue light and green light passing, only the blue image and green image can be seen. So that humans' view can respectively focuses on the left image 31 and the right image 32.

Figure 4:
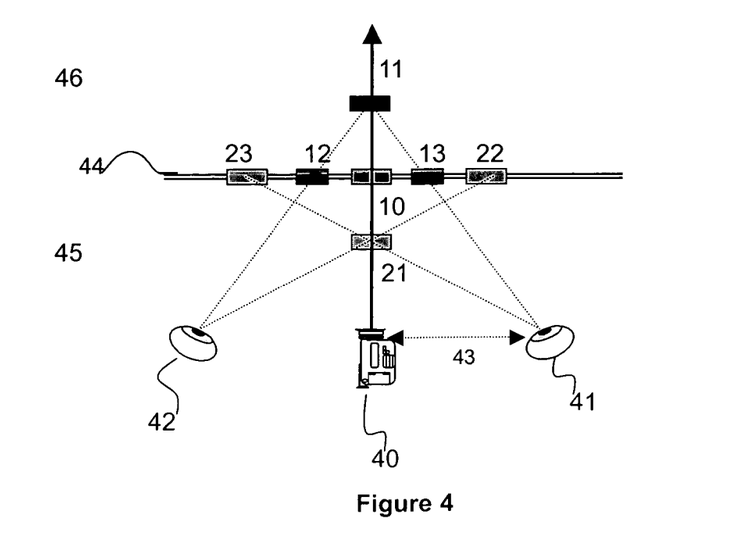
FIG. 4 shows the different offsets of the objects on the projection plane.

FIG. 4 shows the different offsets of the left eye image and right eye image projected on the projection plane. The left eye image and the right eye image are located at different depth positions. Because the object 11 in the CRT space 46 and the object 21 in the viewer space 45 project the image 10 at the same position without stereo effect, a viewer observing the image in the original center line 40 can't see the stereo effect of the objects. When observing the object 11 in the CRT space 46, the object 11 projects a left image 12 in left side of the projection plane 44 to be observed by the left eye 42. The object 11 projects a left image 13 in right side of the projection plane 44 to be observed by the right eye 43. When observing the object 21 in the viewer space 45, the object 21 projects a left image 22 in right side of the projection plane 44 to be observed by the left eye 42. The object 11 projects a right image 23 in left side of the projection plane 44 to be observed by the right eye 43. This is the principle of producing left image and right image of stereo 3D image.

Figure 5:
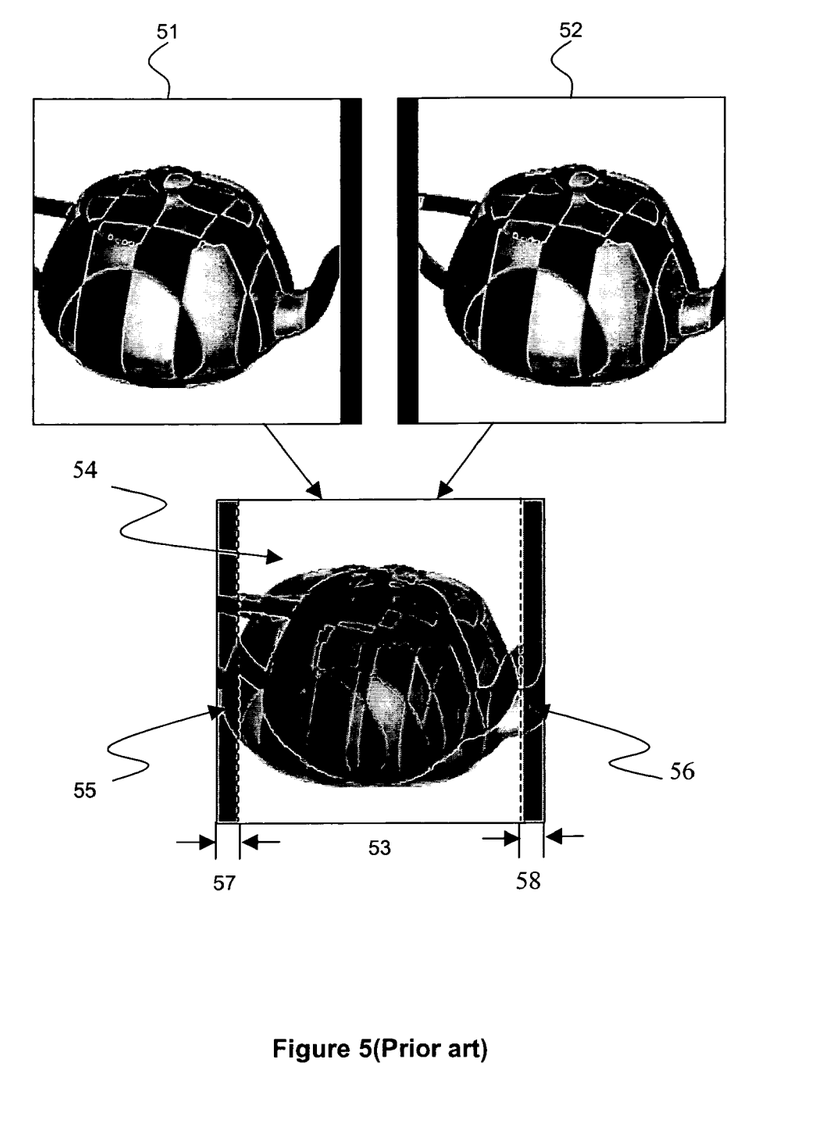
FIG. 5 shows the noise region of an image of the prior art.

As shown in FIG. 5, the computer 3D graphics engine obtains a left image 51 and a right image 52 by shifting the projection image of an object rightward or leftward. Since the 3D graphics engine clips the image beyond the projection section, the left eye image 51 has a noise region in its right side, and the right eye image 52 has a noise region in its left side when the object displayed in monitor (positive parallax). When the left image 51 and the right image 52 are alternately displayed on the monitor, the display shows a noise region 57, 58 respectively in its left and right side.

Figure 6:
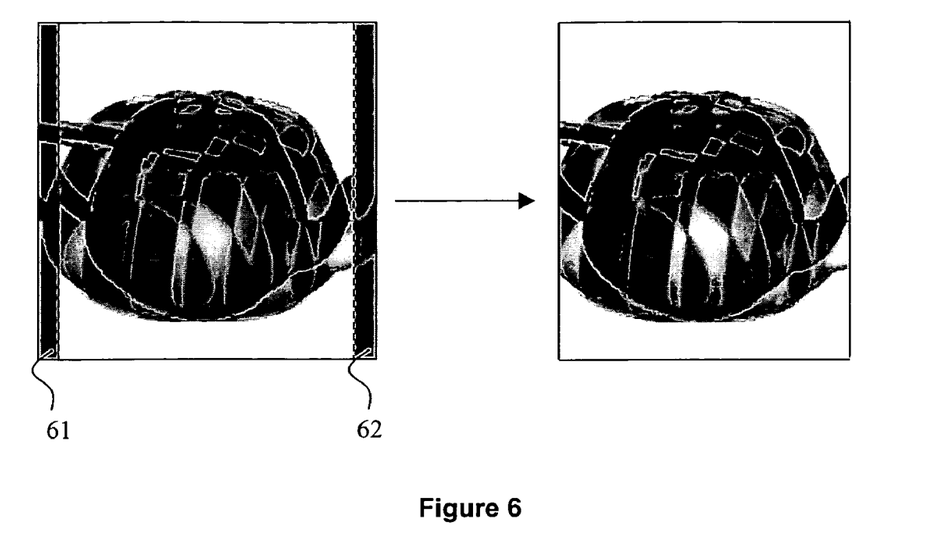
FIG. 6 shows the result of removing the first mask region and the second mask region of the stereo 3D image.

Therefore, there exists a need for removing the a first mask region 61 in the left side of said stereo 3D image and a second mask region 62 in the right side of said stereo 3D image as shown in FIG. 6.

SUMMARY OF THE INVENTION

The main object of the present invention is to provide a method for removing a first mask region in the left side of said stereo 3D image and a second mask region in the right side of said stereo 3D image in the stereo 3D system. After considering to the factor of the distance of humans' eye and the stereo effect and so on, the present invention calculates a mask_size value. Then, the present invention removes the left and right noise regions of the stereo 3D display system by turning a horizontal synchronization signal and a display enable signal of the CRT timing controller.

The present invention relates to a method for removing noise regions in a stereo 3D display system. The stereo 3D image includes a first eye image and a second eye image of an object. The method includes: removing a first mask region in left side of the stereo 3D image and a second mask region in right side of the stereo 3D image during a process of producing the stereo 3D images.

DETAIL DESCRIPTION OF THE INVENTION

Due to the process of producing left eye image and right eye image, the image of prior art on the monitor obtains noises regions. The exemplary embodiment below illustrates the method of the present invention of removing noise region in a stereo 3D display system. The present invention removes the noise regions by determining a mask_size and adjusting the CRT timing signals.

Figure 7:
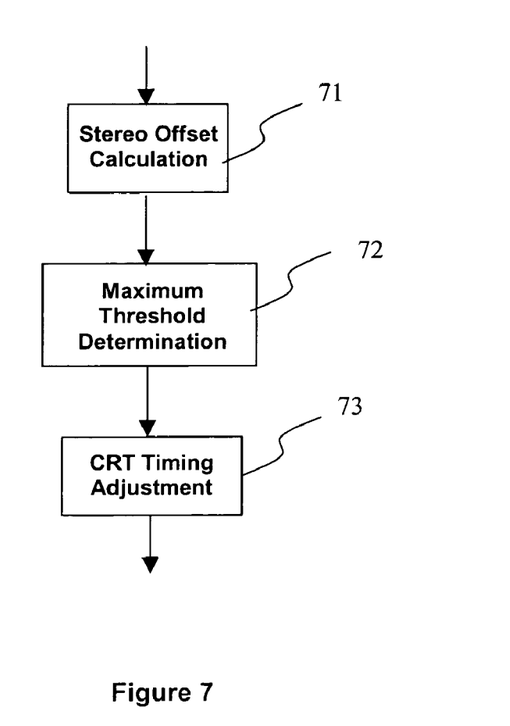
FIG. 7 shows the flowchart of removing the noise region of the stereo 3D image.

As shown in FIG. 7, in the first step 71, the stereo 3D display system calculates the stereo offset and sets up the initial values such as the distance between the pupil and the midpoint of two eyes and a fusion point etc. The fusion point is used to enhance the stereo effect, especially when most of the objects are located in the distant place that the stereo effect is not obvious. After setting the initial values, in the step 73, the stereo 3D display system calculates a mask_size and adequately adjusts the CRT timing signal to remove the noise region in the step 75.

Figure 8:
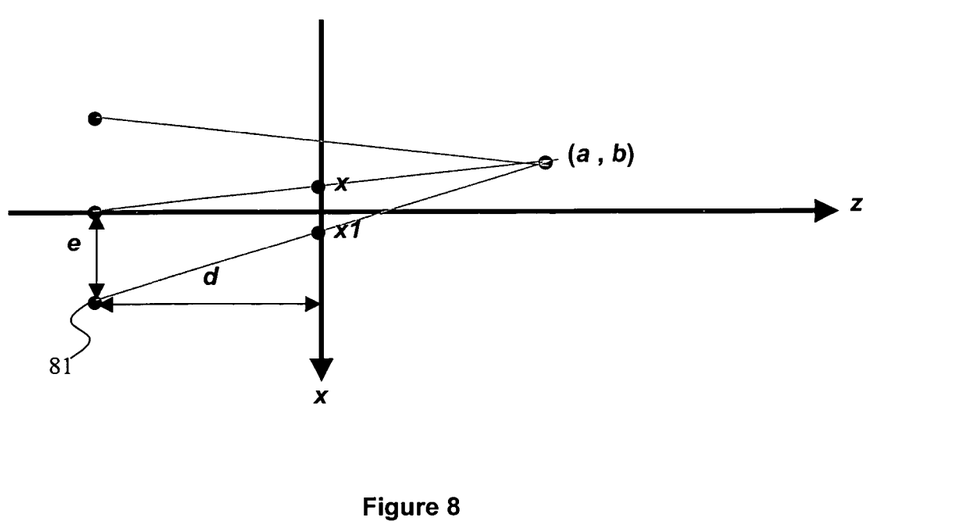
FIG. 8 shows the coordinate of an object watched by a viewer in different location.

FIG. 8 illustrates the calculation of the mask_size value. The X axis represents the projection plane and the Z axis represents the original. Assume that an object is in coordinate (a,b), "a" is the coordinate value of X axis, "b" is the coordinate value of Z axis. If the viewer observes the object at the midpoint of two eyes, the viewer will see the object projecting an image on the X axis through x point, the coordinate value of the x point is obtained by:

$$x = \frac{ad}{b+d},$$

d is the distance between the viewer and the projection plane. If the viewer observes the object by right eye 81, the viewer will see the object projecting an image on the X axis through x1 point, the coordinate value of the x1 point is obtained by:

$$x1 = \frac{(be+ad)}{b+d},$$

e is the distance between the pupil and the midpoint of two eyes. According to above descriptions, the distance between x and x1 is obtained by:

$$\Delta x = x1 - x = \frac{be}{b+d}$$

As known in prior art, the computer graphics system has a Z_buffer storing the depth value of objects and the depth value stored by the Z_buffer is normalized by:

$$Z\_buffer = \frac{(Z-N) \times F}{Z \times (F-N)}$$

N is the near clipping plane, F is the far clipping plane and Z is the true depth value of the object in the reference coordinate.

Generally, objects don't equally distribute in the Z axis but assemble in certain section. To reduce the using of memory and the difficulty of defining Z axis, the system redefines a near clipping plane and a far clipping plane. While the object is out of the ambit of the area between near clipping plane and far clipping plane, the object is discarded.

From FIG. 8, it can be inferred:

$Z=b+d$, $N=d$, so, $b=Z-N$, and $$\Delta x = Z\_buffer \times \frac{(F-N)}{F} \times e$$

(F-N) is between 0 and 1, and in most application $$\frac{(F-N)}{F} \cong 1$$

therefore, it can be inferred that $\Delta x \cong Z\_buffer \times e$

Figure 9:
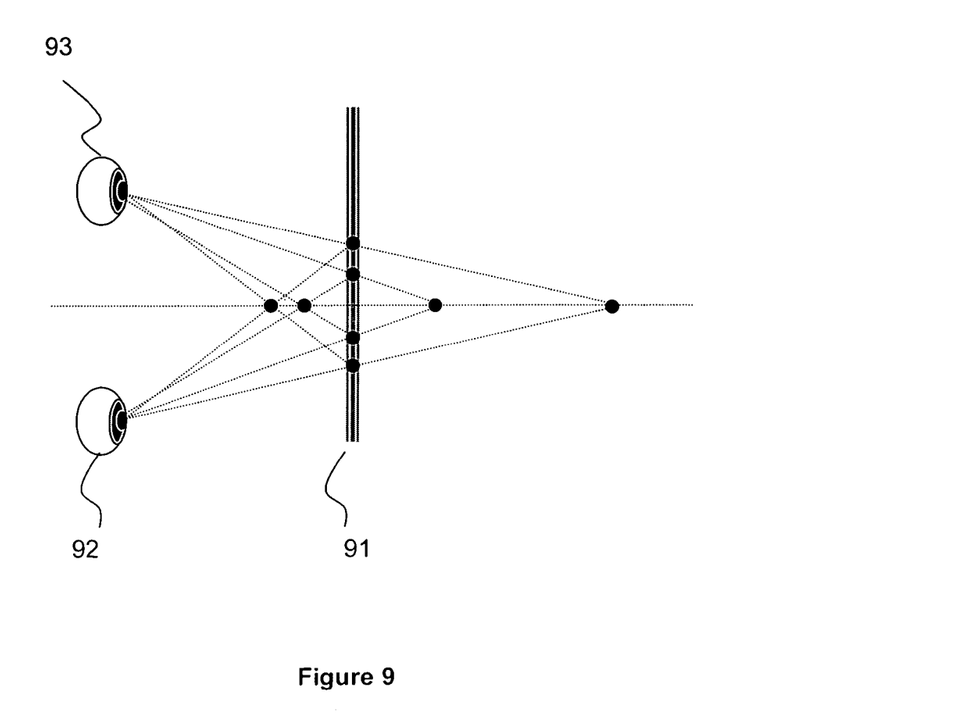
FIG. 9 shows the different stereo effects of images adjusted with the fusion point.

Since the value of the Z-buffer is always positive before defining a fusion point, it can be inferred that Δx is always positive. This represents that all the objects look like sinking into the monitor. FIG. 9 illustrates the function of the fusion point. By adjusting the position of the fusion point, the object looks like sinking into the monitor or float out of the monitor. Defining a fusion point makes the negative value of (Z_buffer−fp) possible. The negative value of (Z_buffer−fp) represents that the object looks like floating out of the monitor.

According to above, Δx is obtained by:

$\Delta x \cong e \times (Z\_buffer - f_p)$ fp is the value of fusion point.

Assume the object is located at maximum depth, and the value stored in the Z_buffer is 1, the noise region value, mask1, is obtained by:

$mask1 = e \times (1.0 - f_p) = e - e \times f_p$

Assume again the object is located at minimum depth, and the value stored in the Z_buffer is 0, the noise region value, mask2, is obtained by:

$mask2 = abs(e \times (0.0 - f_p)) = e \times f_p$

The present invention maximizes the noise region and obtains a mask_size value by:

mask_size=max(mask1, mask2)

Figure 10:
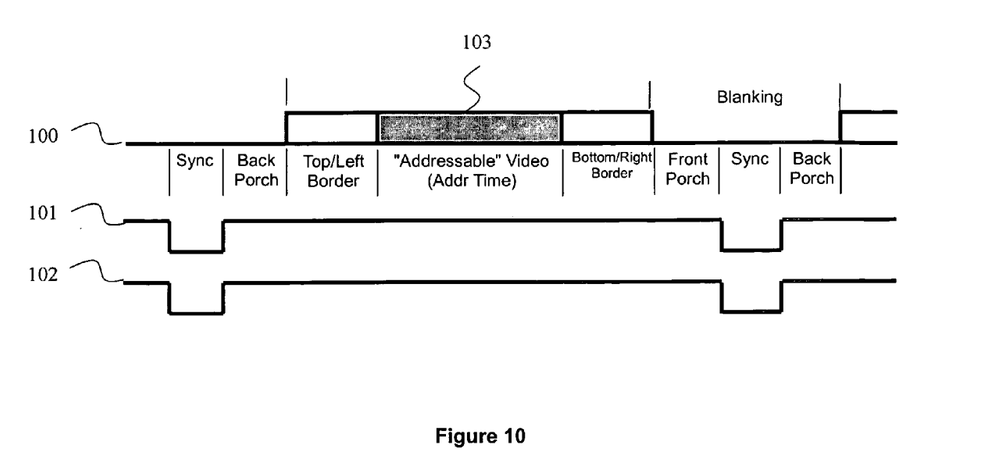
FIG. 10 shows a horizontal synchronization signal, a display enable signal and a vertical synchronization signal.

After determining the mask_size, the present invention removes the noise region of the image by adjusting the CRT signal. As shown in FIG. 10, an image signal 100 can be divided into several parts: Front Porch, Syne, Back Porch, Top/left Border, Addressable Video, and Bottom/Right Border. For the precise display on the monitor, the CRT timing controller synchronizes the receiver with the transmitter by using the rectangle pluses of a horizontal synchronization signal 101 and a vertical synchronization signal 102.

Figure 11:
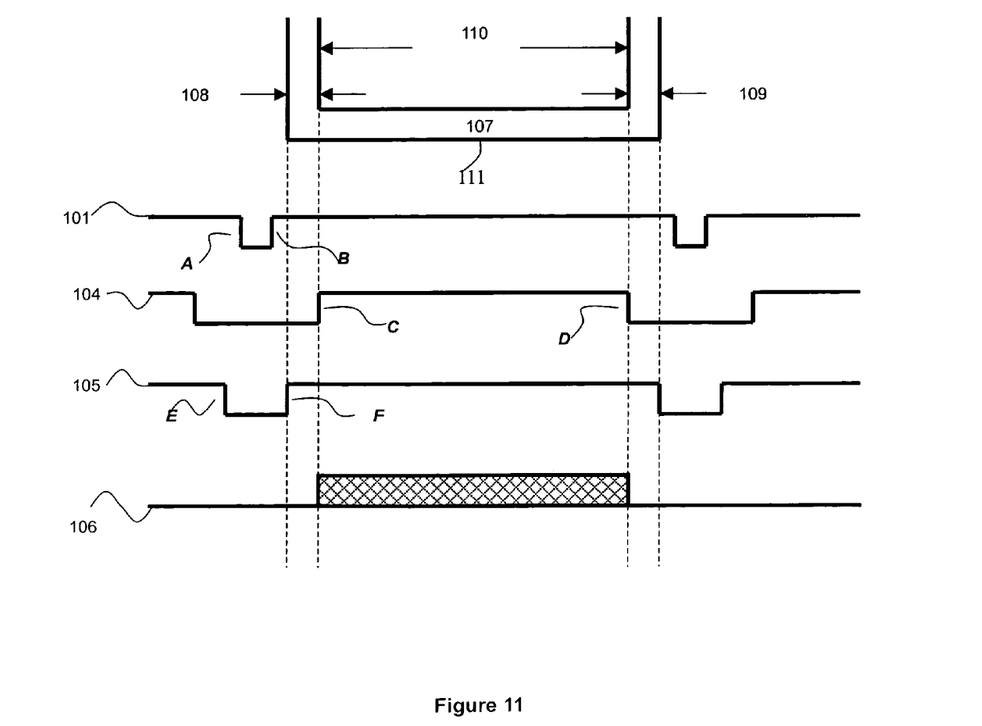
FIG. 11 shows the image display on the monitor is controlled by a horizontal synchronization signal, a display enable signal and an image data.

The display on the monitor is controlled by a horizontal synchronization signal 101, a display enable signal 104, a horizontal blanking signal 105 and an image data signal 106. With reference to FIG. 11, the transmitting and the receiving of the horizontal synchronization signal 101 are synchronous. The display enable signal 104 controls the display of the image on the monitor. The horizontal blanking signal 105 darkens the process of retracing during the image display.

Figure 12:
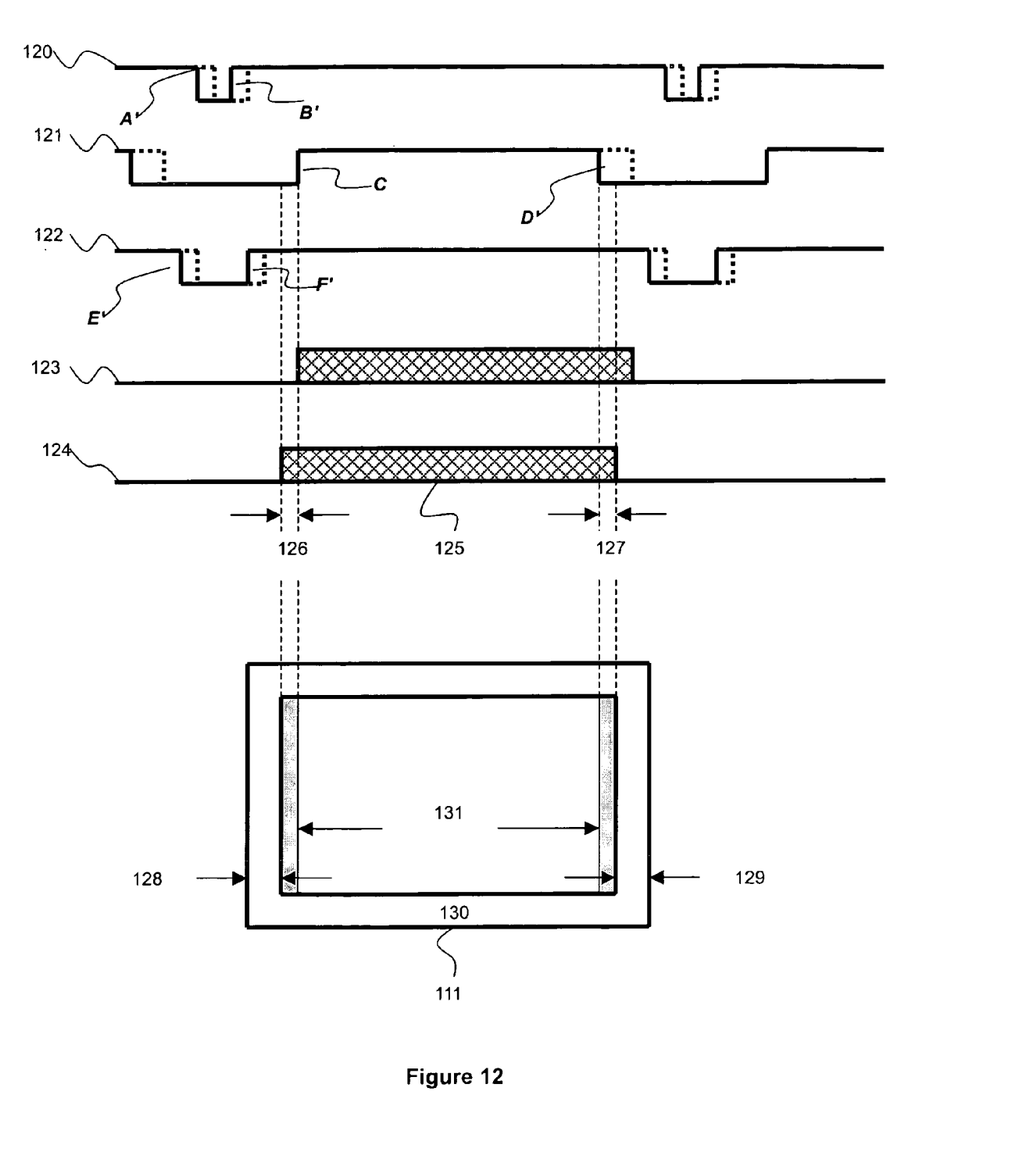
FIG. 12 shows removing the first mask region and the second mask region of the stereo image by turning a horizontal synchronization signal and a display enable signal.

Therefore, the present invention removes a first mask region and a second mask region of the stereo 3D image by turning a horizontal synchronization signal and a display enable signal, as shown in FIG. 12. The method includes: determining a mask_size value from noise regions data, removing the first mask region 126 by shifting a video data signal forward a mask_size value with said horizontal synchronization signal 120, fixing the initial point of the display enable signal 121 and removing the second mask region 127 by shifting an end point of said display enable signal forward two mask-size value.

The first mask region 126 is the noise region in the left side of the stereo 3D image. The second mask region 127 is the noise region in the right side of the stereo 3D image. The size of the first mask region 126 is equal to that of the second mask region 127. The size of the first mask region is equal to that of the mask_size.

While this invention has been described with reference to an illustrative embodiment, this description is not intended to be construed in a limiting sense. Various modifications of the illustrative embodiment, as well as other embodiments of the invention, will be apparent to persons skilled in the art upon reference to this description. It is therefore contemplated that the appended claims will cover any such modifications or embodiments as fall within the true scope of the invention.

What is claimed is:

1. A method for removing noise regions of a stereo 3D image that has a left side and a right side and includes a first eye image and a second eye image of an object, said method comprising:
   removing a first mask region in the left side of said stereo 3D image; and
   removing a second mask region in the right side of said stereo 3D image,
   wherein said first mask region and said second mask region has no overlapping image of said first eye image and said second eye image of said object.

2. The method of claim 1, wherein said first mask region is a noise region in the left side of said stereo 3D image.

3. The method of claim 1, wherein said second mask region is a noise region in the right side of said stereo 3D image.

4. The method of claim 1, wherein the size of said first mask region is equal to that of said second mask region.

5. A method for removing noise regions of a stereo 3D image, said stereo 3D image having a left side and a right side and includes a first eye image and a second eye image of an object, said method comprising:
   removing a first mask region in the left side of said stereo 3D image; and
   removing a second mask region in the right side of said stereo 3D image,
   wherein the size of said first mask region, mask_size1, is obtained by:

mask_size1=max(mask1, mask2), where, max represents the maximum value of the variables in the parenthesis,
   mask1 is a corresponding noise region value as said object is located at a maximum depth,
   mask2 is a corresponding noise region value as said object is located at a minimum depth.

6. The method of claim 5, wherein said noise region value, mask1, is obtained by:

mask1=$e*(Z\_buffer-fp)$, wherein,
   e is the distance between a pupil of a viewer and a midpoint of eyes of said viewer,
   Z_buffer is a depth value of said object, fp is a default value for adjusting the stereo effect of said stereo 3D image.

7. The method of claim 6, wherein value of said Z_buffer is 1.0.

8. The method of claim 5, wherein said noise region value mask2 is obtained by:

mask2=$e*(Z\_buffer-fp)$, wherein,
   e is the distance between a pupil of a viewer and a midpoint of eyes of said viewer,
   Z_buffer is a depth value of said object, fp is a default value for adjusting the stereo effect of said stereo 3D image.

9. The method of claim 8, wherein value of said Z_buffer is 0.0.

10. A method for removing noise region of the stereo 3D image, said stereo 3D images including a first eye image and a second eye image, said method turning a horizontal synchronization signal and a display enable signal, comprising:
    determining a mask_size value from noise regions data;
    removing the first mask region by shifting a video data signal forward a mask_size value with said horizontal synchronization signal; and
    removing the second mask region by shifting an end point of said display enable signal forward two mask-size value.

11. The method of claim 10, wherein said first mask region is a noise region in the left side of said stereo 3D image.

12. The method of claim 10, wherein said second mask region is a noise region in the right side of said stereo 3D image.

13. The method of claim 10, wherein the size of said mask_size is equal to that of said first mask region.

14. The method of claim 10, wherein the size of said first mask region is equal to that of said second mask region.

15. The method of claim 10, wherein the initial point of said display enable signal is fixed.

16. The method of claim 10, wherein said size of said first mask region, mask_size1, is obtained by:

mask_size1=max(mask1, mask2), wherein, max represents the maximum value of variables in parenthesis, mask1 is a corresponding noise region value as said object is located at a maximum depth, mask2 is a corresponding noise region value as said object is located at a minimum depth.

17. The method of claim 16, wherein said noise region mask1 is obtained by:

mask1=$e*(Z\_buffer-fp)$, wherein, e is the distance between a pupil of a viewer and a midpoint of eyes of said viewer, Z_buffer is a depth value of said object, fp is a default value for adjusting the stereo effect of said stereo 3D image.

18. The method of claim 17, wherein value of said Z_buffer is 1.0.

19. The method of claim 16, wherein said noise region mask2 is obtained by:

mask2=$e*(Z\_buffer-fp)$, wherein, e is the distance between a pupil of a viewer and a midpoint of eyes of said viewer, Z_buffer is a depth value of said object, fp is a default value for adjusting the stereo effect of said stereo 3D image.

20. The method of claim 19, wherein value of said Z_buffer is 0.0.

* * * * *